(12) United States Patent
Ferreira et al.

(10) Patent No.: US 9,577,906 B2
(45) Date of Patent: Feb. 21, 2017

(54) SCALABLE PERFORMANCE MONITORING USING DYNAMIC FLOW SAMPLING

(71) Applicant: Cisco Technology, Inc., San Jose, CA (US)

(72) Inventors: Joao Carlos Leite Ferreira, Santa Clara, CA (US); Harinadh Nagulapalli, Milpitas, CA (US); Kangwarn Chinthammit, Fremont, CA (US); Nir Ben-Dvora, Herziliya (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/020,539

(22) Filed: Sep. 6, 2013

(65) Prior Publication Data
US 2015/0074258 A1   Mar. 12, 2015

(51) Int. Cl.
*H04L 12/26* (2006.01)
(52) U.S. Cl.
CPC ......... *H04L 43/0876* (2013.01); *H04L 43/024* (2013.01); *H04L 43/106* (2013.01)
(58) Field of Classification Search
CPC ...... H04L 43/00; H04L 12/26; H04L 43/0876; H04L 43/024; H04L 43/106
USPC ....................................................... 709/224
See application file for complete search history.

(56) References Cited

U.S. PATENT DOCUMENTS

| | | | |
|---|---|---|---|
| 2005/0013300 A1* | 1/2005 | Akahane | H04L 12/2602 370/395.3 |
| 2005/0270984 A1* | 12/2005 | Kodialam | H04L 41/14 370/252 |
| 2008/0279111 A1* | 11/2008 | Atkins et al. | 370/252 |
| 2008/0291915 A1* | 11/2008 | Foschiano | 370/392 |
| 2010/0157809 A1* | 6/2010 | Duffield et al. | 370/241 |
| 2012/0124197 A1* | 5/2012 | Ghai et al. | 709/224 |
| 2014/0198669 A1* | 7/2014 | Brown et al. | 370/250 |

OTHER PUBLICATIONS

Mercer et al., Processor Capacity Reserves, May 15-19, 1994, Proceedings of the International Conference on Multimedia Computing and Systems (10 pages).*

* cited by examiner

*Primary Examiner* — Wing F Chan
*Assistant Examiner* — Leon Y Tseng
(74) *Attorney, Agent, or Firm* — Hickman Palermo Becker Bingham LLP

(57) ABSTRACT

Techniques for scalable performance monitoring using dynamic flow sampling are described. According to one approach, a method comprises intercepting, at an intermediary network device, one or more packets traveling between a source device and a destination device; identifying, at the intermediary network device, a traffic flow based on the one or more packets; determining, at the intermediary network device, whether to collect one or more metrics from the traffic flow based on one or more performance factors of the intermediary network device; in response to a determination to collect the one or more metrics from the traffic flow, the intermediary network collecting the one or more metrics from subsequently intercepted packets belonging to the traffic flow; wherein the method is performed by one or more computing devices.

18 Claims, 4 Drawing Sheets

SCALABLE PERFORMANCE MONITORING USING DYNAMIC FLOW SAMPLING

TECHNICAL FIELD

The present disclosure relates generally to scalable performance monitoring using dynamic flow sampling.

BACKGROUND

In packet switching networks a "traffic flow" (also referred to as a "packet flow") is a sequence of packets between a source device and a destination device which share common characteristics and/or identifiers. For example, a traffic flow may consist of all packets sent during a particular connection, session, media stream, etc. As another example, RFC 2722 "Traffic Flow Measurement: Architecture" authored by Brownlee, et al. describes traffic flows as artificial logical equivalents to a call or connection and elaborates on techniques for identifying and measuring traffic flows.

Collecting metrics related to traffic flows is critical to both service providers and customers to manage the network and monitor application performance. For example, service providers may require metrics regarding the amount of data sent over a particular flow in order to charge the customer for utilizing the service provider's network. As another example, customers may require metrics regarding an application's performance in order to quickly detect potential problems before they have a significant business impact. However, although metrics are important to users of the network, the overhead involved in monitoring the traffic flows can place a significant burden on the network devices (e.g. routers, switches, etc.) forwarding the traffic.

In one approach, the network devices are configured to perform packet sampling. During packet sampling, the network devices monitor only a subset of the packets sent over a given flow. For example, the network devices may randomly select packets for inspection (e.g. based on a packet sampling rate) and perform interpolation to determine the estimated metrics for the entire traffic flow. As a result, packet sampling reduces the workload placed on the network devices since fewer packets are inspected. However, since the network devices collect an incomplete set of data from the flow, the estimated metrics possess a non-zero rate of error. Furthermore, skipping packets impacts on the ability to collect certain types of metrics, such metrics related to network delay and the performance of different phases of an application or protocol.

DESCRIPTION OF EXAMPLE EMBODIMENTS

Figure 1:
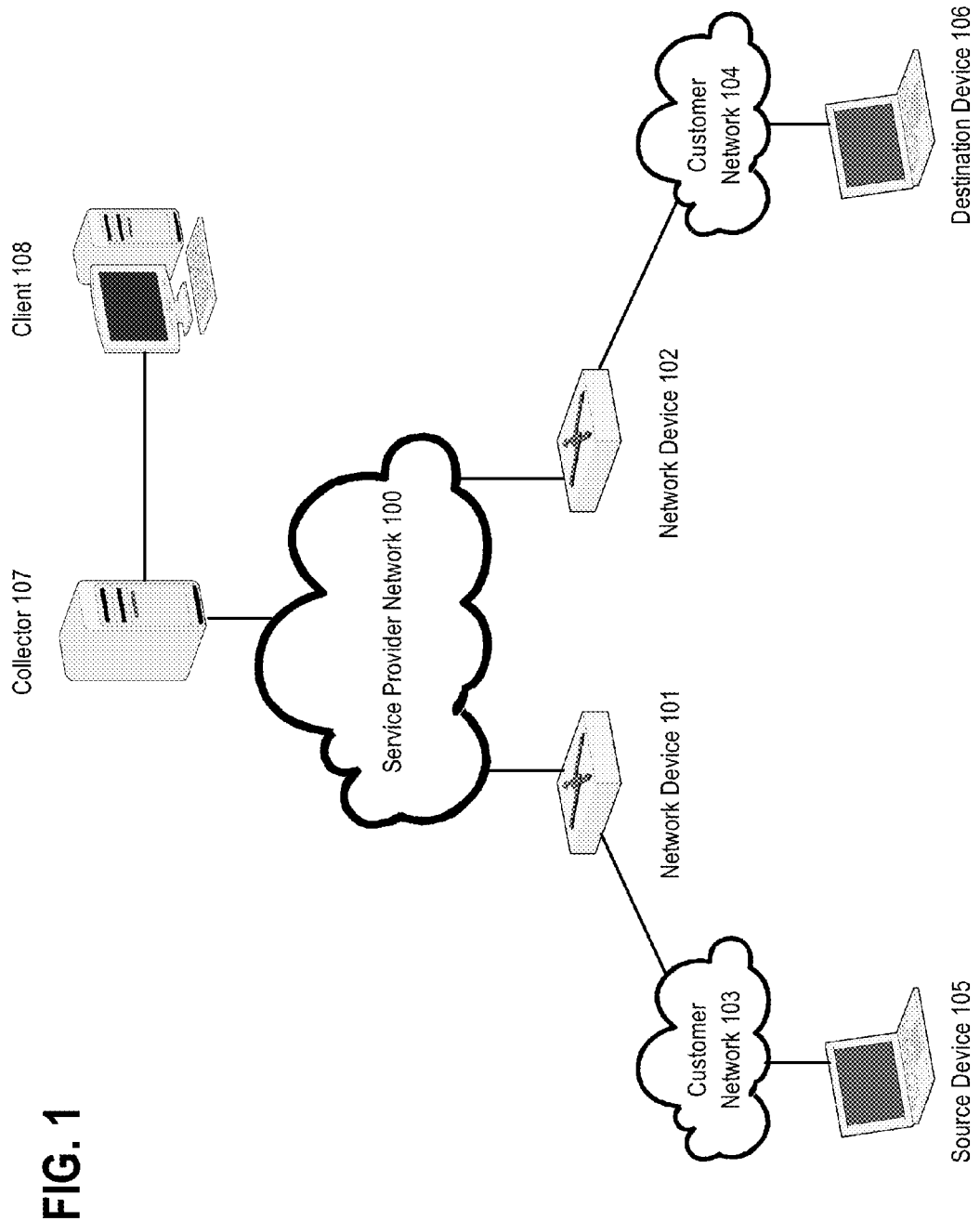
FIG. 1 illustrates an example computer-networking environment with which an embodiment may be implemented.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For convince references will be made to various communications such as "messages", "packets", "frames", "segments", etc. belonging to different layers of the Open System Interconnection (OSI) model. However, mention of a particular type of communication in conjunction with a feature is not intended to limit the feature to only one layer of the OSI model. Thus, a feature discussed as applicable to one layer of the OSI model may also be applicable to other layers of the OSI model as well.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Embodiments are described herein according to the following outline:
 1.0 General Overview
 2.0 Example Computer-Networking Environment
 3.0 Example Traffic Flow Identification and Storage System
 4.0 Network Device Process Flow
 5.0 Hardware Overview
 6.0 Extensions and Alternatives
 1.0 General Overview Techniques for scalable performance monitoring using dynamic flow sampling are described. Other techniques have attempted to balance between the overhead incurred by monitoring traffic flows and the accuracy of the collected metrics by employing packet sampling. However, in some cases, packet sampling hinders or precludes the collection of many metrics deemed important by users of the network.

Network users may require the ability to monitor how their applications are performing on the network. Since the performance of an application may require visibility into many different types of metrics, the overhead imposed on the network devices collecting the information can be significant. However, in some cases, the metrics required by the network users cannot be accurately captured when packets are skipped for inspection via packet sampling.

For example, network devices often measure delay based on the amount of time between receiving a message from a source device and receiving the subsequent response from the destination device. However, under packet sampling, there is no guarantee that both the source device's message and the destination device's response will be inspected. As a result, the network device will often have insufficient information available to measure network delay.

As another example, applications and protocols are often divided into logical "phases", for performing different tasks. For instance, connections established using Transmission Control Protocol (TCP) can be considered as progressing through three distinct stages, referred to as the connection establishment phase, the data transfer phase, and the connection termination phase. In the connection establishment phase, the endpoints engage in a three way handshake to synchronize the connection and allocate resources for the subsequent data transfer. In the data transfer phase, the endpoints exchange messages to transfer data between the underlying applications. In the connection termination phase, the endpoints close the established connection and release the allocated resources.

In some cases, network users may require the ability to determine how well an application or protocol is performing during a particular phase. Thus, for instance, a customer may need to know the amount of network delay experienced during the connection establishment phase of a TCP connection, the amount of data sent during the data transfer phase of a TCP connection, etc. One way a network device can collect such metrics is to maintain a state machine for a traffic flow that is modeled after the underlying protocol or application and which moves in lockstep with the communicating devices as messages are collected from the traffic flow. Thus, when a message is inspected, the network device can determine which phase the state machine is currently in and marks the metrics as belonging to that phase. As a result, the metrics belonging to one phase can be differentiated from metrics belonging to a different phase. However, if packets are skipped due to packet sampling, the state machine maintained by the network device may fall out of sync with the traffic flow, rendering the network device unable to accurately assign the collected metrics to a particular phase.

The foregoing issues are addressed in embodiments that implement a sampling technique referred to as "flow sampling". During flow sampling the network device performs a binary decision of whether or not to monitor a given flow. When a flow is monitored, the network device inspects each message sent over the flow to collect the appropriate metrics. When a flow is not monitored, the network device forwards that flow's messages without collecting the metrics. As a result, the workload imposed on the network device is reduced by monitoring fewer flows, but the information collected from the monitored flows is error-free and allows the network device to obtain virtually any type of metric.

In some embodiments, the network device maintains monitoring information, such as a log or running total, indicating how many flows have been monitored out of the total number of flows that have been identified. The network device then provides this monitoring information to a "collector" component/device which performs statistical analysis on the collected metrics to estimate metrics for the flows that have not been monitored.

Some embodiments are configured to dynamically modify the rate at which flows are sampled based on the CPU utilization of the network device. In many cases, the number of messages that need to be forwarded through the network can vary drastically over time. At some points in time the network may be flooded with activity, and at other times the network may experience a lull in activity. While collecting metrics is important, the primary purpose of the network devices is to reliably and efficiently forward messages to their intended destinations. If the flow sampling rate is set to a static number (e.g. 50%, 60%, 70%, etc.), then the workload put on the network device may become overwhelming when network activity peaks. As a result, the network device may begin delaying or dropping packets, which can have a significant impact on the performance of the applications communicating over the network. To prevent this issue, in some embodiments, the network device maintains a table, function, or other mechanism that indicates the sampling rate to be used based on the current CPU utilization of the network device. Thus, as demand on the network device increases, fewer flows are monitored in order to reduce overhead. Further, when demand on the network device decreases, more flows can be monitored to provide users with additional information regarding application performance over the network.

In some embodiments, dynamically modifying sample rate can also be applied to packet sampling, increasing or decreasing the rate at which packets are sampled from a given flow based on the CPU utilization of the network device.

In an embodiment, a method comprises intercepting, at an intermediary network device, one or more packets traveling between a source device and a destination device; identifying, at the intermediary network device, a traffic flow based on the one or more packets; determining, at the intermediary network device, whether to collect one or more metrics from the traffic flow based on one or more performance factors of the intermediary network device; in response to a determination to collect the one or more metrics from the traffic flow, the intermediary network collecting the one or more metrics from subsequently intercepted packets belonging to the traffic flow; wherein the method is performed by one or more computing devices.

In other embodiments, the invention encompasses a system, computer apparatus, and a computer-readable medium configured to carry out the foregoing steps.

2.0 Example Computer-Networking Environment

FIG. 1 illustrates an example computer-networking environment with which an embodiment may be implemented. In FIG. 1, a source device 105 located in customer network 103 is communicatively coupled to a destination device 106 located in customer network 104 via service provider network 100. Network device 101 and network device 102 reside on the edge between service provider network 100 and customer network 103, 104 respectively and intercept/forward packets as a hop along a network path between source device 105 and destination device 106. In addition, network device 101 and network device 102 collect metrics related to traffic flows formed by the intercepted packets and report the metrics to collector 107. The collector 107 stores the metric information and, depending on the embodiment, performs statistical analysis to determine various statistics and estimated metrics for consumption by the client 108. The client 108 provides an interface through which a user may request and view the metrics and statistical information stored by the collector 107.

Although only a particular number of each of the aforementioned elements is depicted in FIG. 1, a practical environment may have many more, perhaps thousands or millions, of each depicted element. In addition, the network layout of the computer-networking environment depicted in FIG. 1 may change from embodiment to embodiment. For example, client 108 may be communicatively coupled to collector 107 through one or more networks, such as service provider network 100. As another example, the source device 105 and/or destination device 106 may be coupled to the respective network device 101, 102 without an intermediary customer network 103, 104. Network device 101, 102 may belong to any one or more of customer network 103, 104, the service provider network 100, or another intermediary network not explicitly depicted in FIG. 1. In addition, network device 101, 102 may be located within the aforementioned networks at a location other than a network edge. Furthermore, as another example, the computer-networking environment may contain multiple instances of the collector 107, each collecting metrics from a different region of the service provider network 100 or different subsets of network devices. The collectors may then share the collected metrics between themselves or may be configured in a hierarchical fashion where information is transferred upwards to a supervising collector for eventual consumption by the client 108. The use of customer networks and a service provider network are not required in all embodiments and some embodiments may be implemented in a LAN or in an enterprise networking environment that is entirely owned or operated by a party without a separate service provider or customers.

In an embodiment source device 105 and destination device 106 (collectively "the monitored devices") are computing devices, such as the example computing device described herein in the "Hardware Overview" section. In another embodiment, the monitored devices are specialized computing devices. For example, the monitored devices may be video infrastructure or audio infrastructure devices that are optimized for services such as video conferencing, digital telephony, and/or telepresence. In still other embodiments, the monitored devices represent network end stations such as laptop computers, server computers, mobile computers, tablet computers, smartphones, etc. or may represent software components executing on one or more computing systems. For the purpose of illustrating clear examples, the term "source device" will be used to identify the device initiating a given communication and the "destination device" will used to identify the responding device. However, in a practical environment, the monitored devices may take on both roles interchangeably or simultaneously depending on the underlying communication protocol. For example, a protocol may follow a two-way authentication scheme where each device separately initiates an authentication session with the other.

In an embodiment, service provider network 100, customer network 103, and customer network 104 (collectively "the networks") represent any combination of one or more local networks, wide area networks, or internetworks. Data exchanged over the networks, may be transferred using any number of network layer protocols, such as Internet Protocol (IP), Multiprotocol Label Switching (MPLS), Asynchronous Transfer Mode (ATM), Frame Relay, etc. Furthermore, in embodiments where the networks represent a combination of multiple sub-networks, different network layer protocols may be used at each of the underlying sub-networks. In some embodiments, any or all of the networks may represent one or more interconnected internetworks, such as the public Internet.

In an embodiment, network device 101 and network device 102 (collectively "the network devices") represent internetworking infrastructure elements such as switches, routers, proxy servers, or gateways responsible for forwarding packets through the networks. The network devices are configured to identify traffic flows and collect metrics related to the traffic flows passing through the networks (e.g. between the monitored devices). For example, the network devices may be equipped with Enterprise Medianet, Netflow, and/or Metric Mediation Agent technology, commercially available from Cisco Systems, Inc., San Jose, Calif.

In an embodiment, the traffic flows identified by the network devices represent sequences of packets adhering to a protocol for transferring messages between the monitored devices. Depending on the embodiment, the protocol may belong to any number of communication layers, such as the transport layer, application layer, session layer, etc. In some embodiments, the protocol may be a connection-oriented protocol, such as Transmission Control Protocol (TCP), or a connectionless protocol, such as User Datagram Protocol (UDP). In some embodiments, the network devices identify traffic flows based on packets containing common characteristics, such as source/destination network address, source/destination port address, segment identifiers, etc.

In an embodiment, collector 107 represents a computing device or server executing a diagnostic tool application for monitoring the traffic flows transmitting over the networks. In some embodiments, the collector 107 represents a data storage center or data warehouse for archiving metrics collected from the network devices. In some embodiments, the collector 107 pre-processes the metrics before storage. For example, the collector 107 may compress the data in order to save space. As another example, the collector 107 may synthesize the metrics, such as by converting the raw data into one or more statistics (e.g. convert specific measurements into average, median, variance, etc.). In other embodiments, the collector 107 may average the similar metrics over a group of network flows. For example, if a group of flows (or all flows) come in with a network delay of 9-11 ms, the collector 107 can reduce space by marking that network segment as having a delay of 10 ms for the associated period of time and deleting the redundant information for each individual flow.

In one embodiment, the network devices report traffic flow information to the collector 107 at specified intervals of time. For example, the export process may be configured to occur every minute. In another embodiment, the network devices report traffic flow information to the collector 107 in response to particular events, such as discovering a new traffic flow, receiving a threshold number of new packets over a particular traffic flow, detecting that a flow has ended, etc. In yet another embodiment, the collector 107 periodically polls the network devices to request traffic flow information or polls the network devices in response to user input received by the client 108. In some embodiments, the network devices are configured to only send data that has been collected since the last export. For example, the network device can be configured to report out to the collector every five minutes the metrics collected over the monitored flows for the last five minutes. Furthermore, in some embodiments, the network devices can be configured to send a particular subset of the collected metrics or metrics belonging to a particular subset of flows. For example, the client 108 may provide users with options to control the type of metrics collected by the network devices and/or sent to the collector 107.

In some cases, in order to reduce load on the network devices, the information transferred to the collector 107 may be kept to a minimum by default, such as a report out of only the number or percentage of flows that are currently being monitored, thus allowing more detailed metrics to be sent upon request or at a later point in time when network activity is below a particular threshold.

In some embodiments, the network devices report out the number of flows sampled vs. the number of flows that are not sampled as a separate statistic independent of the metric information for the flows. In another embodiment, the network devices export the sampling information as an additional metric for the individual flows. In an embodiment, the network devices can be configured to report out one or more of the following: percentage of flows sampled, percentage of flows sampled per application, flows not sampled (e.g. sending the identification information for the flows but leaving out the metrics that were not collected), or the conditions which caused a particular flow to be sampled (e.g. CPU or memory utilization measurement relied upon by the network devices when deciding to sample the flow).

The client 108 represents a computing device or software component providing a user interface that allows users to request, search, and view information stored by the collector 107. Thus, the client 108 provides a textual and/or visual presentation of the metrics to the users to aid in detecting problems and making decisions regarding the configuration of the networks and/or applications using the networks. In some embodiments, the user interface provided by the client 108 also allows the user to specify sampling and reporting conditions for the collector 107 and/or network devices, such as by allowing to user to enable/disable dynamic flow sampling, modify the sampling rates used at various levels of utilization, specify a flat sampling rate, modify the frequency of information report outs between the network devices and the collector 107, etc.

In some embodiments, the information and metrics collected from the flows are used by the network devices in real time to modify routing behavior. For example, the network devices may reroute a flow that is experiencing more than a threshold amount of delay by forwarding that flow's packets to a different router. As a result, in some embodiments, the client 108 may provide an option that allows users to set different levels of sampling, such as collecting only metrics that impact routing behavior, a specified subset of the metrics, all the metrics, or none of the metrics.

3.0 Example Traffic Flow Identification and Storage System

Figure 2:
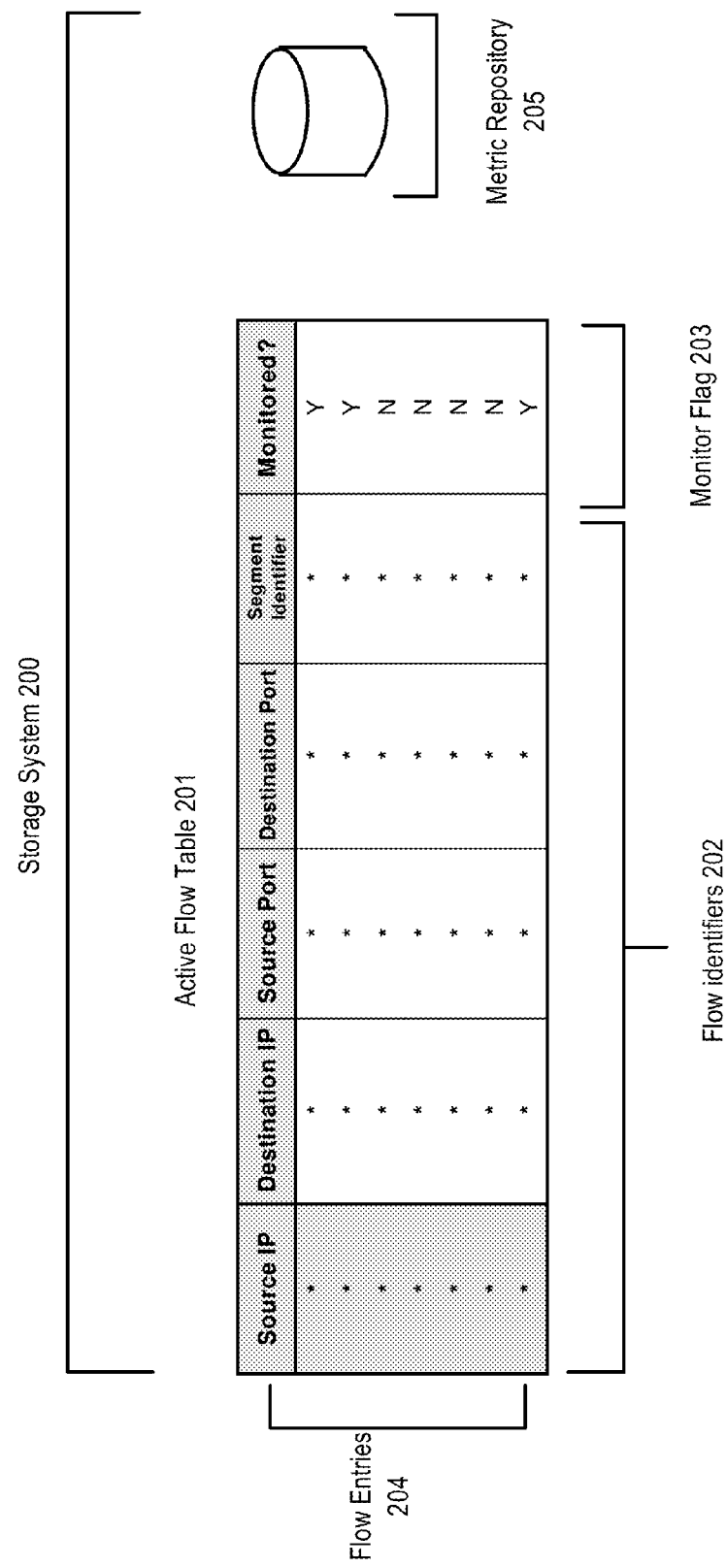
FIG. 2 illustrates an example storage system with which the network devices may store traffic flow identification and metric information according to an embodiment.

FIG. 2 illustrates an example storage system with which the network devices may store traffic flow identification and metric information according to an embodiment. For example, the storage system 200 of FIG. 2 may be implemented in network device 103 and network device 104 of FIG. 1. However, in some embodiments, the collector 107 may also implement some or all of the elements depicted in FIG. 2 to track flows and store metrics.

In FIG. 2, active flow table 201 represents a data structure that stores flow entries 204 identifying flows that are currently being used by the monitored devices to transfer messages. In the active flow table 201, each row represents a different traffic flow and each column represents a feature or characteristic of the corresponding traffic flow. Although FIG. 2 depicts the aforementioned information in tabular form, other embodiments may store flow identification data in any useful format or data structure. In an embodiment, each flow is defined within the active flow table 201 by one or more flow identifiers 202 that uniquely identify a given traffic flow, such source IP address, destination IP address, source port address, destination port address, segment identifier, etc. In an embodiment, packets traveling in one direction (for example, from source device 105 to destination device 106) are considered to belong to the same flow as packets traveling in the opposite direction (destination device 106 to source device 105).

In addition to the flow identifiers 202, the active flow table 201 maintains a monitor flag 203 for each traffic flow, indicating whether or not the associated flow is being monitored for the purpose of collecting metrics. The monitor flag 203 can be used by the network devices to determine the total number or percentage of active flows that are currently being monitored. In embodiments where the flow sampling rate is determined by CPU utilization of the respective network device, the number or percentage of flows being monitored can also serve as an indicator of the current level of network activity.

In some embodiments, the active flow table 201 stores, for each monitored flow, a pointer or link (not depicted) to a state machine that identifies the current state of the protocol that is used to transfer messages over the corresponding traffic flow. For example, in the event that a particular flow is communicating via TCP, the network devices may store an in-memory state machine that mimics the TCP connection and moves in lockstep with the state of the actual TCP connection in response to inspecting segments or sequences of segments (e.g. SYN, SYN/ACK, ACK, CLOSE/FIN, etc.) received over the particular flow. As a result, the network devices can determine the current phase of the underlying protocol or application based on the state machine.

In some embodiments, the network devices identify new flows to add to the active flow table 201 based on receiving one or more packets that do not match the flow identifiers 202 of any flow already included within the active flow table 201. For example, the network devices may receive a packet from a new source, heading for a new destination, or using different ports than traffic flows already included in the active flow table 201. In addition, the network devices may remove flows from the active flow table 201 based on inactivity or due to termination of the underlying protocol. For example, to address inactivity, the network devices may maintain a timestamp for each active flow indicating the last time a packet was received over that flow. In response to a determination that a threshold amount of time has passed since the timestamp was last updated, the network devices consider the flow as having "timed out" and remove the flow from the active flow table 201. Thus, the network devices can be configured to consider a break between sequences of packets of more than a threshold period of time as being indicative of a new flow, even if the characteristics of the packet match those of a previously identified flow.

As another example, to address termination of the underlying protocol, the network devices may be configured to monitor the phases of the protocol being used to transfer messages over a given traffic flow. Thus, the network devices can determine when the protocol is terminated based on detecting particular messages belonging to the protocol (e.g. CLOSE/FIN segments of a TCP connection) and in response remove the flow from the active flow table 201. Further, in embodiments where the network devices are monitoring the protocol via a state machine, the state machine moving to a termination state can be used as a trigger to remove the flow from the active flow table 201.

The metric repository 205 represents a database or other data store that indexes and stores metrics collected from active and inactive traffic flows. For example, the metrics for each flow may be indexed or uniquely identified within the metric repository 205 based on the flow identifiers 202 and timestamps indicating when the traffic flow began and when the traffic flow ended. As another example, the network devices may assign each flow a unique identification number that can be used to locate the corresponding metrics within the metric repository 205. In some embodiments, in order to save space, the metric repository 205 may store only information pertaining to the active flows. For example, when a flow is removed from the active flow table 201, the network devices may report any information pertaining to that flow to the collector 107 for storage before clearing that flow's information from the metric repository 205.

Depending on the embodiment, the network devices may store raw metrics (e.g. time delay between each packet, amount of data contained by each packet, etc.), synthesize/preprocessed metrics (mean/average time delay, mean/average packet size, etc.) or a combination of both within the metric repository 205. In other embodiments, the network devices store and export raw metrics to the collector 107, which then performs synthesizing/preprocessing on the metrics prior to storage. In some embodiments, when the network devices maintain a state machine for a given flow, the metrics stored in the metric repository 205 may be tagged or marked with an indication of the phase during which the metrics were collected.

4.0 Network Device Process Flow

Figure 3:
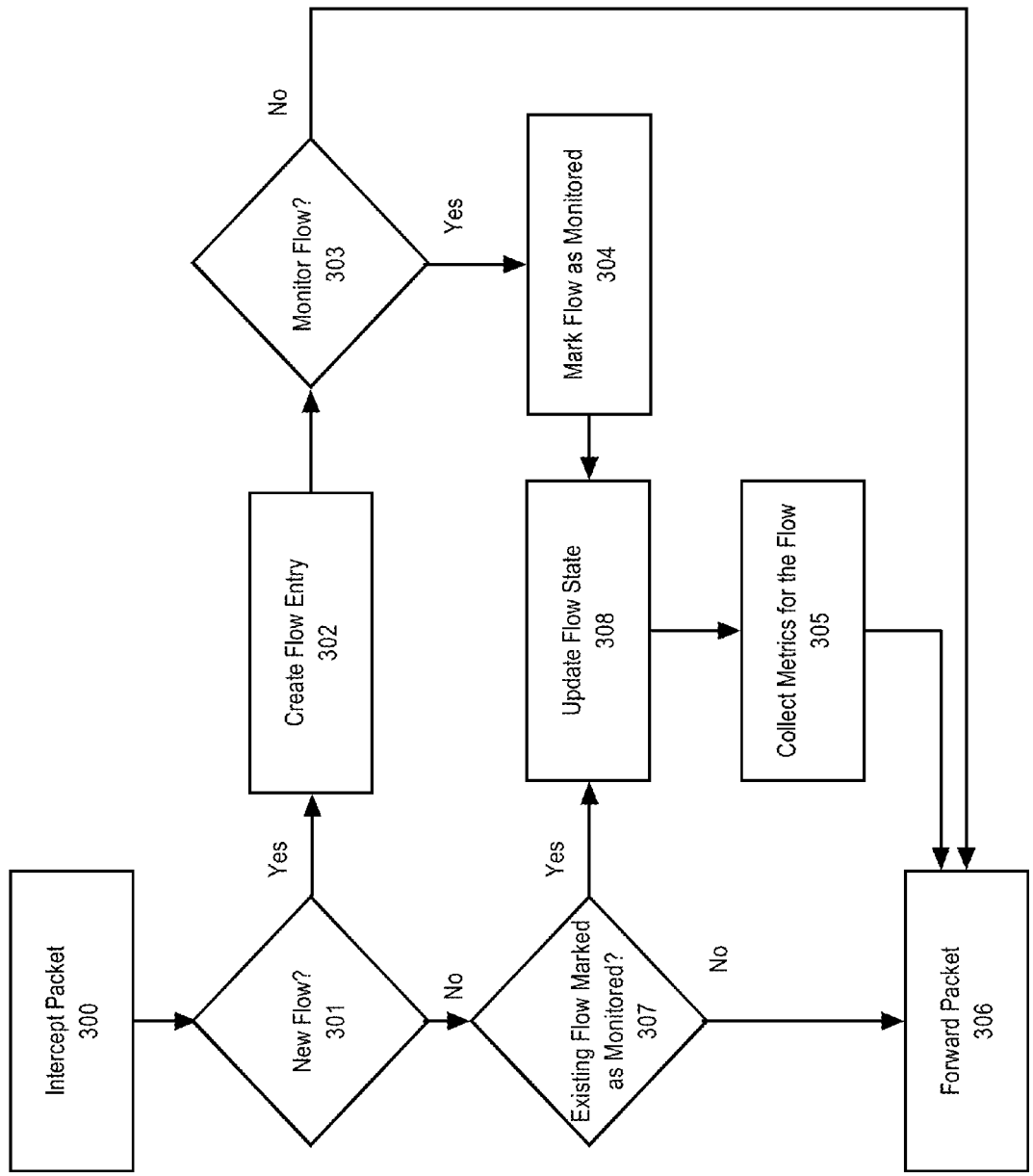
FIG. 3 illustrates an example process flow for a network device according to an embodiment.

FIG. 3 illustrates an example process flow for a network device according to an embodiment. For the purpose of illustrating clear examples, the process flow depicted in FIG. 3 will be explained in reference to network device 101. However, a same or substantially similar process can also be utilized at network device 102 and any other network device in the networks of FIG. 1 or other implementations.

At block 300, network device 101 intercepts a packet traveling between the source device 105 and the destination device 106. In an embodiment, network device 101 intercepts the packet because that network device is a hop along a network path between the source device 105 and the destination device 106. For example, the network device 101 may be installed as a gateway between the customer network 103 and the service provider network 100 in order to guarantee that packets entering or exiting the customer network 103 will be intercepted by the network device 101. For networks which possess more than one point of entry, an embodiment may maintain a network device implementing the process flow of FIG. 3 at each point of entry.

At block 301, network device 101 determines whether the packet belongs to a new flow or an existing flow. In an embodiment, the network device 101 inspects the packet's headers (e.g. network layer header, transport layer header, etc.) to determine the packet's flow identifiers 202. The network device 101 then compares the flow identifiers 202 of the packet to the flow entries 204 in the active flow table 201. If a matching flow entry is not located, the network device 101 determines that the packet belongs to a new flow and proceeds to block 302. If a matching flow entry is located, the network device 101 has detected a packet belonging to an existing flow and proceeds to block 307.

At block 302, the network device 101 creates a new flow entry within the active flow table 201. In an embodiment, the network device 101 creates a new entry and populates the entry with the flow identifiers 202 from the packet intercepted at block 300. In some embodiments, the network device 101 supports the collection of phase-specific metrics for certain types of metrics. Thus, when creating the flow entry, the network device 101 also creates a state machine that mimics the protocol used to communicate over the flow. In cases the network device 101 may support phase-specific metrics for only a subset of the possible protocols that could be used to communicate over a flow. As a result, the network device 101 may skip the creation of the state machine in response to a determination that the protocol is unrecognized or otherwise not supported. In other embodiments, the state machine may only be created for entries representing flows which are currently being monitored. For example, the state machine may be created in response to the determination performed at block 303.

At block 303, the network device 101 determines whether to monitor the flow. In an embodiment, the network device 101 maintains a table, function, or other mechanism that specifies the flow sample rate based on current CPU utilization. For example, the network device 101 may use flow sample rate a when CPU utilization is between 0-30%, sample rate b when CPU utilization is between 30%-60%, and flow sample rate c when CPU utilization is over 60%. In some embodiments, the mechanism for determining flow sample rate is configured so that the flow sample rate is inversely proportional to CPU utilization. Thus, as CPU utilization increases, the flow sample rate decreases to reduce the load on the network device 101. The network device then randomly determines whether to monitor the flow based on the flow sample rate. In some embodiments, the network device 101 may base the flow sample rate on a range or window of previously collected CPU utilization values. For example, the network device 101 may determine a sampling rate at time n based on CPU utilization measured from time 1 to n−1. In an embodiment, the network device 101 uses the average of the previously measured CPU utilizations.

In some embodiments, the network device 101 performs the sampling in intervals. For example, the network device 101 may lock in a sampling rate during a particular interval and recalculate the sample rates at the end of each interval. In some embodiments, the intervals are fixed periods of time such as a number of seconds, minutes, hours, etc. However, in other embodiments, the sampling rate may be determined by hardware limitations of the network device 101.

In another embodiment, the network device 101 adjusts the sample rate incrementally. For example, the network device 101 may maintain an optimal CPU utilization, such as 75%, and incrementally increase or decrease the sample rate over time until the optimal CPU utilization is obtained. As a result, even when network conditions change over time, the network device 101 will automatically adjust to the sample rate needed to obtain the optimal CPU utilization.

In some embodiments, the network device 101 may use factors unrelated to CPU utilization when determining the sample rate for a given flow. For example, applications deemed highly important for collecting metrics may provide an identifier or marker in the packet's header which can be used by the network device 101 to prompt an increase in the flow sampling rate (e.g. to 100%). Similarly, applications which are not important for collecting metrics can also use a different marker, prompting the network device 101 to decrease the sampling rate for those flows (e.g. to 0%). In some embodiments, the network device 101 may utilize a Quality of Service (QoS) identifier or marker to determine a sample rate for a given flow. In some embodiments, the network device 101 may use another metric, such as memory utilization or the utilization of other hardware resources, instead of CPU utilization or in addition to CPU utilization when determining the sample rate.

In some embodiments, the network device 101 applies a filter to the collection of metrics for the flow. For example, the network device 101 may determine to collect only a subset of the potential metrics from the flow. The filter may weigh each metric differently, resulting in a greater or lesser chance that a particular metric will be collected. Thus, rather than determining whether to monitor a flow generally, the network device 101 may perform an independent determination for each individual metric. In some embodiments, the client 108 provides the user with a user interface for controlling the weights given to each metric, thus allowing the user to increase or decrease the probability that a given metric will be collected for a given flow. For example, a metric important to the user may be increased up to 100% probability, whereas a metric that is not as important to the user may be decreased down to 0% probability.

In response to a determination to monitor the flow, the network device 101 proceeds to block 304. Otherwise, the network device 101 proceeds to block 306.

At block 304, the network device 101 marks the flow as monitored in the active flow table 201. In an embodiment, the network device marks the flow as being monitored by setting the monitor flag 203 in the active flow table 201.

At block 308, the network device 101 modifies the state of the flow based on the packet intercepted at block 311. In embodiments where the network device 101 created a state machine for the flow at block 302, the network device 101 can advance the state machine to the next state depending on the information contained in the intercepted packet. Using TCP as an example, the state machine may specify that the flow is in a state associated with the "connection establishment" phase and advance the state machine to a state associated with the "data transfer" phase in response to receiving the final ACK segment of the TCP three way handshake. In the event that the protocol being used to communicate over the flow is not supported or if the embodiment does not track in phase-specific metrics, the network device 101 can skip block 308. In some cases, receiving a packet over a given flow may not cause the state of the flow to change. Thus, in such cases, the network device 101 can skip block 308.

At block 305, the network device 101 collects metrics for the flow. In an embodiment, the metrics collected by the network device 101 includes but are not limited to network delay, packet size, jitter/call quality (e.g. for digital telephony or telepresence applications), packet loss, and protocol/application phase specific metrics. In some cases metrics may require more than one packet from the flow in order to be calculated. For example, to determine network delay, the network device 101 may store timestamps indicating when previously intercepted packets were received and calculate the delay once the corresponding response from the destination device 106 has been detected.

In an embodiment, the network device 101 collects one or more of the follows types of information and metrics from the flow for storage in the metric repository 205: application identification information (name, vendor, version, etc.), web metrics (e.g. host, referrer, url, uri, etc.), media metrics (e.g. bytes, media event flags, packets), application specific metrics (e.g. group name for NNTP, server for pop3, etc.), connection metrics (e.g. client, delay, new connections, server, transaction etc.), digital telephony metrics (e.g. codec, call duration, jitter, etc.), consolidated metrics (e.g. total bytes, packets, flows, etc.), network layer metrics (e.g. source/destination IP address, fragmentation, hop limit, time to live, payload length, traffic class, etc.), policy metrics (e.g., QoS flags, performance policies, etc.), transport metrics (e.g., source/destination port address, round trip time, TCP/UDP fields, etc.), timestamp information (e.g. absolute time since epoch, monitoring interval, system uptime, etc.).

In some embodiments, the metrics collected at block 305 are stamped or otherwise associated with a value indicating the state of the flow, which can be used during subsequent analysis to determine the performance of the flow during particular states. In some embodiments, the network device 101 may filter the metric collection to only collect metrics when a particular state of the flow is active.

At block 306, the network device 101 forwards the packet. In an embodiment, the network device 101 intercepts the packet at block 300 as a hop along the network path between the source device 105 and the destination device 106. Thus, at block 306, the network device 101 forwards the packet to the next hop along the path (e.g. via a routing table or other routing mechanism).

At block 307, the network device 101 determines whether the flow is marked as monitored in the active flow table 201. In an embodiment, the network device determines whether the flow is marked by performing a lookup into the monitor flag 203 of the entry in the active flow table 20 corresponding to the flow identifiers 302 of the packet intercepted at block 300.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, network devices or any other device that incorporates hard-wired and/or program logic to implement the techniques.

Figure 4:
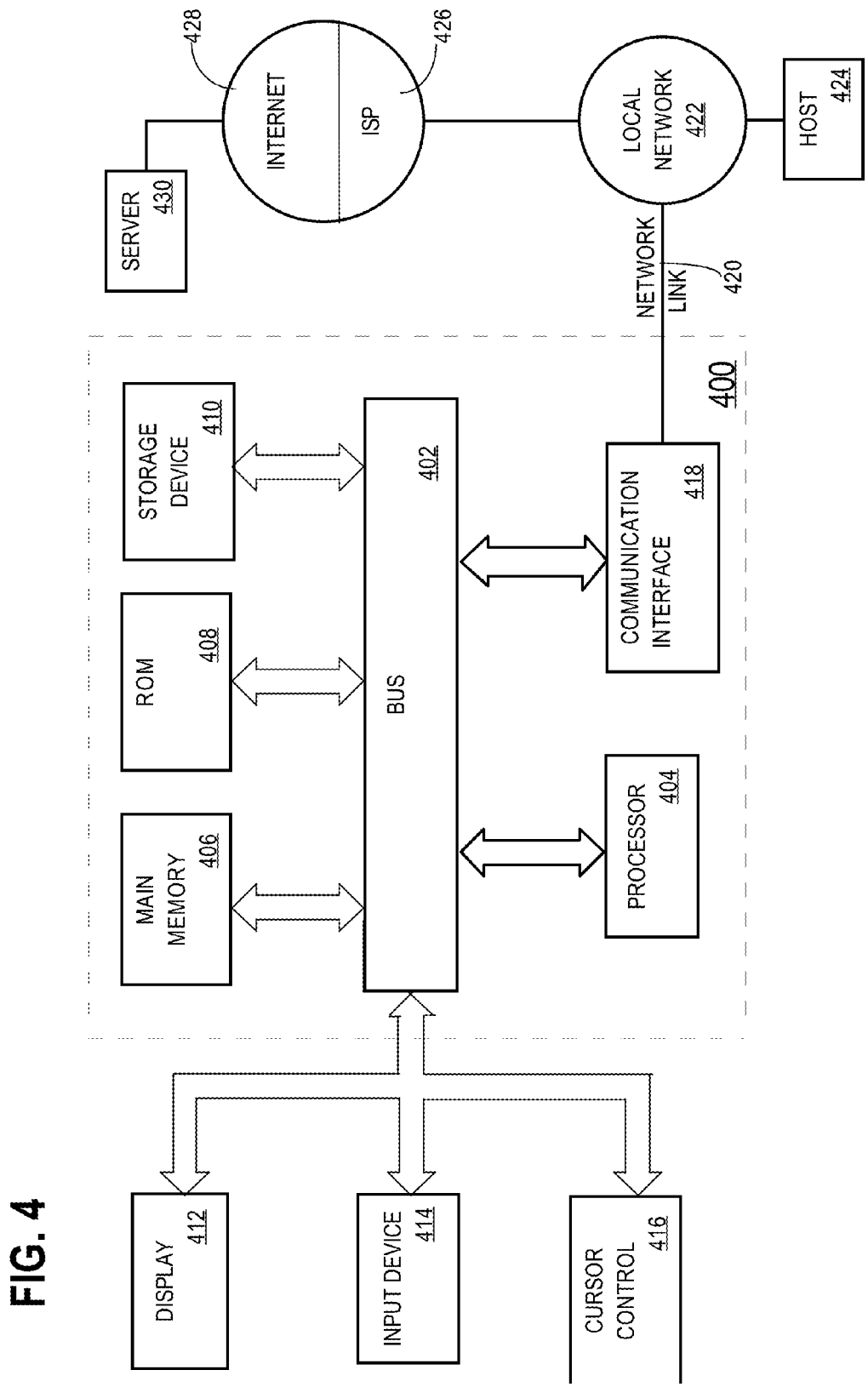
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   intercepting, at an intermediary network device, one or more packets traveling between a source device and a destination device;
   identifying, at the intermediary network device, a traffic flow based on the one or more packets;
   randomly determining based on a flow sample rate, at the intermediary network device, whether to:
   (a) inspect all packets intercepted from the traffic flow to collect one or more metrics, or
   (b) inspect none of the packets intercepted from the traffic flow to collect the one or more metrics;
   wherein the flow sample rate is dependent on one or more performance factors of the intermediary network device;
   wherein the one or more performance factors include one or more of: utilization of one or more processors of the intermediary network device or memory utilization of the intermediary network device;
   in response to a determination to inspect all packets intercepted from the traffic flow to collect the one or more metrics, the intermediary network inspecting all subsequently intercepted packets belonging to the traffic flow to collect the one or more metrics;
   wherein the method is performed by one or more computing devices.

2. The method of claim 1, further comprising sending at least a portion of the one or more metrics to a collector device.

3. The method of claim 1, wherein determining whether to collect the one or more metrics from the traffic flow is based at least in part on central processing unit (CPU) utilization of the intermediary network device.

4. The method of claim 1, wherein the traffic flow adheres to a multi-phase protocol and collecting the one or more metrics from the subsequently intercepted packets includes determining during which phase of the multi-phase protocol the one or more metrics are being collected.

5. The method of claim 1, wherein the one or more metrics include one or more of: application identification information, web metrics, media metrics, application specific metrics, digital telephony metrics, connection metrics, consolidated metrics, network layer metrics, transport metrics, or timestamp information.

6. The method of claim 1, further comprising adding information identifying the traffic flow to a data structure specifying active traffic flows, determining which traffic flows of the active traffic flows are being monitored, and reporting a number or percentage of the active traffic flows that are being monitored to a collector device.

7. A non-transitory computer readable medium storing one or more instructions which, when executed by one or more processors, cause the one or more processors to perform steps of:
 intercepting, at an intermediary network device, one or more packets traveling between a source device and a destination device;
 identifying, at the intermediary network device, a traffic flow based on the one or more packets;
 randomly determining based on a flow sample rate, at the intermediary network device, whether to:
 (a) inspect all packets intercepted from the traffic flow to collect one or more metrics, or
 (b) inspect none of the packets intercepted from the traffic flow to collect the one or more metrics;
 wherein the flow sample rate is dependent on one or more performance factors of the intermediary network device;
 wherein the one or more performance factors include one or more of: utilization of one or more processors of the intermediary network device or memory utilization of the intermediary network device;
 in response to a determination to inspect all packets intercepted from the traffic flow for to collect the one or more metrics, the intermediary network inspecting all subsequently intercepted packets belonging to the traffic flow to collect the one or more metrics.

8. The non-transitory computer readable medium of claim 7, wherein the steps further comprise sending at least a portion of the one or more metrics to a collector device.

9. The non-transitory computer readable medium of claim 7, wherein determining whether to collect the one or more metrics from the traffic flow is based at least in part on central processing unit (CPU) utilization of the intermediary network device.

10. The non-transitory computer readable medium of claim 7, wherein the traffic flow adheres to a multi-phase protocol and collecting the one or more metrics from the subsequently intercepted packets includes determining during which phase of the multi-phase protocol the one or more metrics are being collected.

11. The non-transitory computer readable medium of claim 7, wherein the one or more metrics include one or more of: application identification information, web metrics, media metrics, application specific metrics, digital telephony metrics, connection metrics, consolidated metrics, network layer metrics, transport metrics, or timestamp information.

12. The non-transitory computer readable medium of claim 7, wherein the steps further comprise adding information identifying the traffic flow to a data structure specifying active traffic flows, determining which traffic flows of the active traffic flows are being monitored, and reporting a number or percentage of the active traffic flows that are being monitored to a collector device.

13. An apparatus comprising:
 one or more processors;
 one or more non-transitory computer-readable storage mediums storing one or more instructions which, when executed by the one or more processors, cause the one or more processors to:
 intercept, at an intermediary network device, one or more packets traveling between a source device and a destination device;
 identify, at the intermediary network device, a traffic flow based on the one or more packets;
 randomly determine based on a flow sample rate, at the intermediary network device, whether to:
 (a) inspect all packets intercepted from the traffic flow to collect one or more metrics, or
 (b) inspect none of the packets intercepted from the traffic flow to collect the one or more metrics;
 wherein the flow sample rate is dependent on one or more performance factors of the intermediary network device;
 wherein the one or more performance factors include one or more of: utilization of one or more processors of the intermediary network device or memory utilization of the intermediary network device;
 in response to a determination to inspect all packets intercepted from the traffic flow to collect the one or more metrics, inspect, at the intermediary device, all subsequently intercepted packets belonging to the traffic flow to collect the one or more metrics.

14. The apparatus of claim 13, wherein the one or more instructions, when executed by the one or more processors, further cause the one or more processors to send at least a portion of the one or more metrics to a collector device.

15. The apparatus of claim 13, wherein the determination whether to collect the one or more metrics from the traffic flow is based at least in part on central processing unit (CPU) utilization of the intermediary network device.

16. The apparatus of claim 13, wherein the traffic flow adheres to a multi-phase protocol and the collection of the one or more metrics from the subsequently intercepted packets includes determining during which phase of the multi-phase protocol the one or more metrics are being collected.

17. The apparatus of claim 13, wherein the one or more metrics include one or more of: application identification information, web metrics, media metrics, application specific metrics, digital telephony metrics, connection metrics, consolidated metrics, network layer metrics, transport metrics, or timestamp information.

18. The apparatus of claim 13, wherein the one or more instructions when executed by the one or more processors further cause the one or more processors to add information identifying the traffic flow to a data structure specifying active traffic flows, determine which traffic flows of the active traffic flows are being monitored, and report a number or percentage of the active traffic flows that are being monitored to a collector device.

* * * * *